United States Patent Office 3,605,472
Patented Sept. 20, 1971

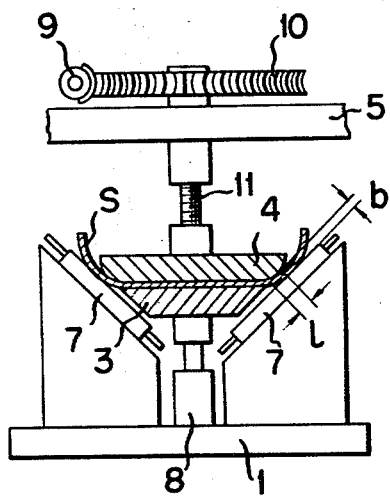
FIG. 1
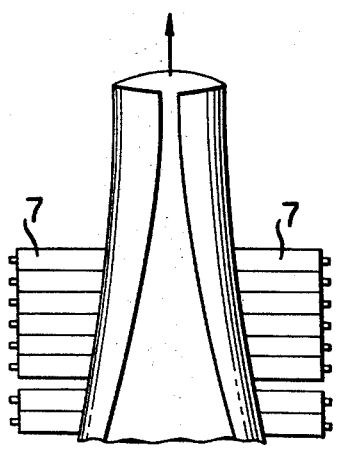
FIG. 2
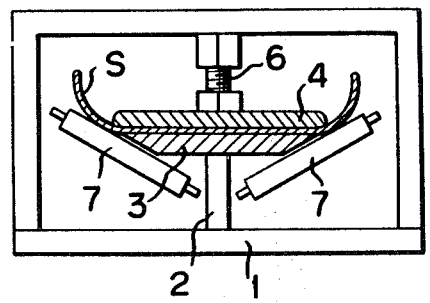
FIG. 3
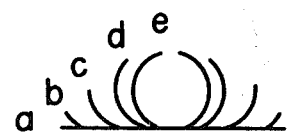
FIG. 4
FIG. 5
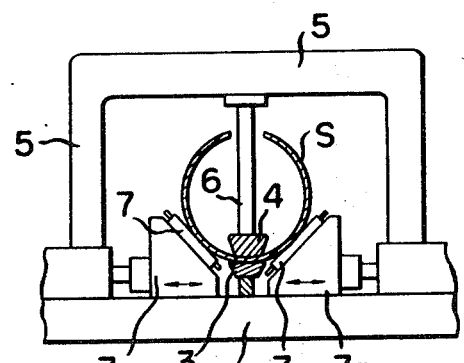

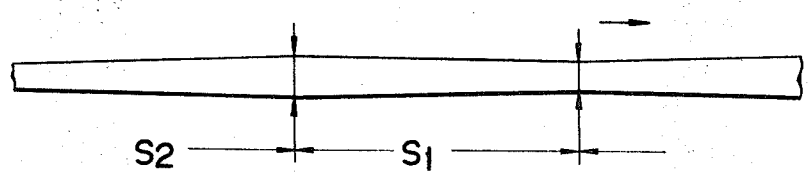
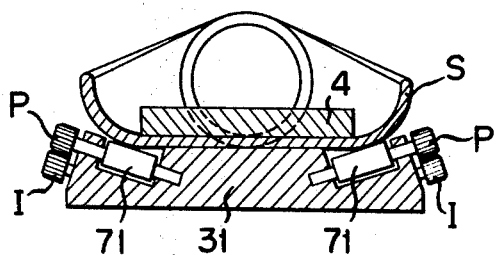
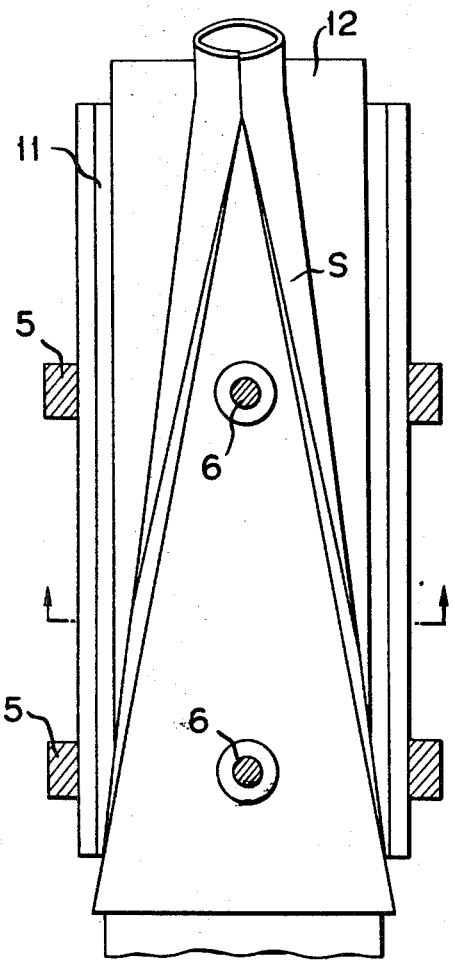
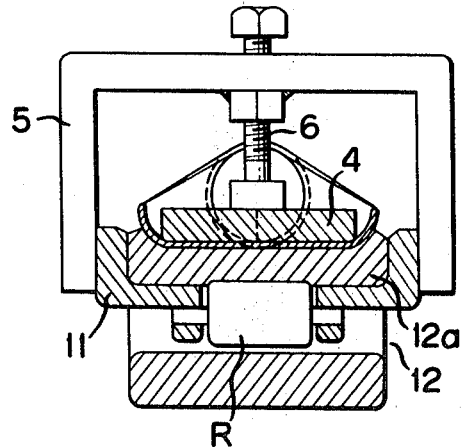
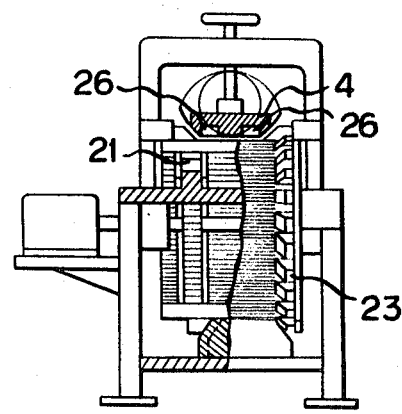

3,605,472
APPARATUS FOR FABRICATION OF STRUCTURES
Akihiro Saito and Takashi Nakamura, Kawasaki-shi, Kanagawa-ken, Japan, assignors to Kabushikikaisha Dengensha Seisakusho, Kanagawa-ken, Japan
Filed May 12, 1969, Ser. No. 823,884
Claims priority, application Japan, May 21, 1968, 43/34,172; June 28, 1968, 43/45,331; Sept. 25, 1968, 43/69,358; Oct. 7, 1968, 43/72,949; Jan. 30, 1969, 44/6,970
Int. Cl. B21d 5/08
U.S. Cl. 72—176
2 Claims

ABSTRACT OF THE DISCLOSURE

A base plate and a guide plate both having a planar shape of an isoceles triangle clamp and constrain between them a strip material advancing through the space between them from the base to the vertex of that triangle, thereby emerging from that space and successively contacting, from its laterally outermost edge part to its inner part, low-friction forming members which progressively bend and curl the material, ultimately into a tubular form.

BACKGROUND OF THE INVENTION

This invention relates generally to the production of tubular structures from strip or ribbon material and more particularly to a new and improved apparatus for continuous fabrication of tubular structures fom a longitudinally traveling strip material (hereinafter referred to as "strip").

In continuous tube-fabricating apparatus known heretofore, forming rolls or forming dies are used, and by causing a strip material to pass through pairs of rolls or dies provided in a number of stages, the strip material is formed into a tubular structure, the lateral edges thereby being brought together into mutually abutting or opposed relationship or into overlapping relationship and then being joined by butt welding or seam welding thereby to fabricate a tube.

These known apparatus have been accompanied by certain drawbacks and deficiencies. For example, the fabrication of their rolls or dies entails high cost and highly skilled labor, whereby the entire apparatus tends to be expensive. Furthermore, in order to change over or convert the apparatus to the fabrication of tubes of different diameter, it has been necessary to change all of the rolls or dies provided in several stages. Such changing of the rolls or dies not only necessitates much labor and time but also gives rise to loss which cannot be neglected due to unproductive inoperation of the apparatus during that time.

As means for eliminating the disadvantageous features of prior apparatus, an apparatus for continuously forming a strip into a tube in which no rolls or dies whatsoever are used has been invented by Harvey Burr as disclosed in U.S. Pat. 3,387,478 (application filed Apr. 14, 1966, patent allowed June 11, 1968).

According to the specification of this Burr patent, the apparatus includes a base plate and a guide plate parallel to the base plate and spaced away from it so as to define a passage confining and guiding a strip material. The guide plate is described as having one or two edges defining a lengthwise exit from the passage. The apparatus further has means for blocking the passage at an acute angle to the edge to compel the strip to advance from the passage obliquely to the edge and a baffle having a flat, strip-deflecting surface opposing and sloping away from each edge.

In the operation of this Burr apparatus, the advancing strip strikes against the baffle at the place where it passes out through the exit, thereby being curved, and as it passes through the passage defined by the guide plate and the base plate, the strip is caused to assume a substantially tubular form.

The curvature of tube forming operation in this Burr apparatus can be varied merely by varying the positional relationship of the baffle relative to the aforementioned edges. It is apparent, therefore, that this Burr apparatus is superior to tube-fabricating apparatus in which rolls, dies, and the like are used.

However, scoring or galling of the strip surface due to frictional rubbing between this surface and the baffle cannot be avoided. Furthermore, the motive power for causing the strip to curl into a curved structure is supplied by the power for causing the strip to move, that is, the power for drawing the strip in the longitudinal direction thereof. Accordingly, when the thickness of the strip is large, a considerable force must be applied to the strip to cause curling thereof. In actual practice, however, drawing of the strip with such a large force is difficult.

SUMMARY

In view of the circumstances briefly described above, it is an object of the present invention to provide apparatus for fabricating tubular structures in which the undesirable features of prior apparatus are removed, and there is no possibility of occurrence of scoring or galling of the surface of the product.

Another object of the invention is to provide apparatus capable of fabricating tubular structures easily and continuously from even strip materials of relatively large thickness.

According to the present invention, briefly summarized, there is provided, in apparatus of the type which progressively curls an advancing strip, ultimately into a tubular form, the combination therewith of clamping means for constraining the strip in a constraint region which becomes progressively narrow in the strip advance direction and for forming an advance path for the strip and members with baffle surfaces which receive the parts of the strip emerging out of the constrain region and curl these parts progressively and ultimately into a tubular form.

The nature, principle, details, and utility of the invention will be more clearly apparent from the following detailed description with respect to preferred embodiments of the invention when read in conjunction with the accompanying drawings, in which like parts are designated by like reference numerals and characters.

BRIEF DESCRIPTION OF THE DRAWINGS

In the drawings:

FIG. 1 is a top plan view, with a part foreshortened and parts cut off, showing essential parts of one example of apparatus embodying the invention;

FIG. 2 is a cross section of the apparatus shown in FIG. 1;

FIG. 3 is a diagrammatic view in cross section indicating the sequential steps in which a strip material is curled by the apparatus illustrated in FIGS. 1 and 2;

FIG. 4 is a cross-sectional view showing a modification of the apparatus illustrated in FIGS. 1 and 2;

FIG. 5 is a cross-sectional view showing a second modification of the apparatus shown in FIGS. 1 and 2;

FIG. 6 is a top plan view, with end parts cut off, showing a strip material suitable for use in the example apparatus illustrated in FIGS. 4 and 5;

FIG. 7 is a cross sectional view showing still another embodiment of the invention;

FIG. 8 is a top plan view, with parts cut off, showing a further example of apparatus embodying the invention;

FIG. 9 is a cross-sectional view of the apparatus shown in FIG. 8;

FIG. 11 is partly an end view and partly a cross-sectional view of the example apparatus illustrated in FIG. 10;

DETAILED DESCRIPTION

Figure 10:
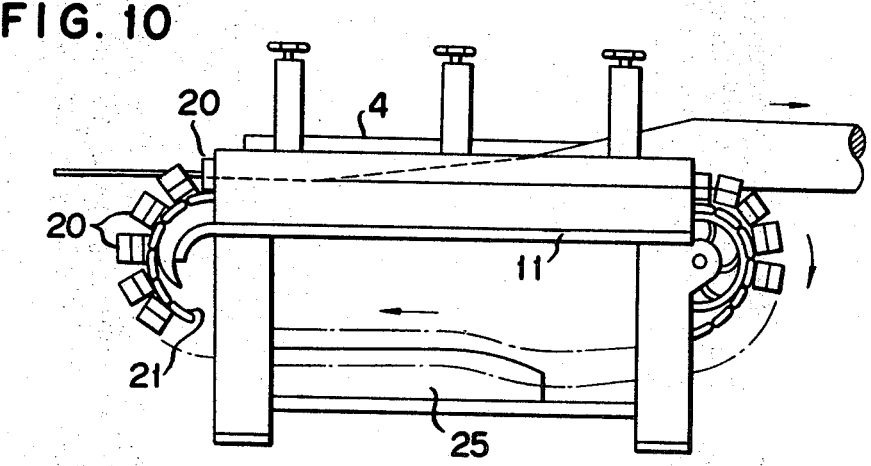
FIG. 10 is a side elevation showing still another embodiment of the invention.

Referring first to FIGS. 1 and 2, there is shown a basic form of apparatus according to the invention. The apparatus has a foundation structure 1 on which columns 2 rigidly support a base plate 3, which, in plan view, has the shape of a narrow isosceles triangle tapering convergently in the direction of travel of a strip material S constituting the workpiece and described hereinafter. The base plate 3 is so disposed that its centerline, that is, axis of symmetry, is parallel to the direction of travel of the strip and that the base (upstream end) thereof is parallel to the plane of conveyance of the strip, the base plate being so inclined that the downstream end thereof is lower than the base or upstream end.

The base plate 3 functions to support the moving strip S to be formed into a tubular structure, which strip is guided by and pressed downward against the base plate 3 by a guide plate 4 having approximately the same shape and size as the base plate and superposed thereabove with the strip S interposed therebetween. The guide plate 4 is pressed downward against the strip by a plurality of adjustable bolts 6 in screw engagement with respective arch or gantry frames 5 spaced apart in the direction of travel of the strip and fixed to and supported by the foundation structure 1.

The lateral edge parts of the base plate 3 are beveled with respective beveled surfaces inclining inwardly and downwardly from the extreme edges. A row of a plurality of parallel carrier rollers 7 having rotational axes transversely parallel to each of the beveled edge surfaces of the base plate 3 is provided in positions spaced-apart in the strip travel direction. Accordingly, as viewed in cross section perpendicular to this direction, the two rows of rollers 7, 7 are in a V-shaped disposition. These rollers are respectively supported rotatably at their ends by conventional bearings, which are not shown for the sake of simplicity.

In the operation of the apparatus of the essential organization as described above according to the invention, the strip S is passed through the gap formed between the base plate 3 and the guide plate, being fed into the opening of this gap on the upstream side (by means not shown) and drawn out of the downstream exit end (by other means not shown). During this passage of the strip through this gap, the parts of the strip from its laterally outermost part to its innermost part are successively caused to contact at least one of the rollers 7, 7 and are subjected to curving or curling force whereby the strip is progressively curled as indicated by the sequence of curves $a$ to $e$ in FIG 3 until it finally assumes a substantially cylindrical shape.

While this operational action and state are similar to those in the aforementioned Burr apparatus, the roller rows formed by rollers 7, 7 used in the apparatus of the present invention are used instead of the baffle plates in the Burr apparatus. These rollers 7, 7 are caused to rotate during the drawing of the strip and thereby greatly reduce friction forces acting counter to the movement of the strip as it is drawn. Therefore, scouring or galling of the surfaces of the strip S is substantially minimized.

Furthermore, by providing a row of rollers having axes of rotation perpendicular to the advance direction of the strip at each lateral edge of the guide plate 4, it is possible to prevent scoring, galling, and other abrasive damage to the upper surface of the strip material, that is, the inner surface of the tubular structure to be formed from the strip material.

The tube forming curvature, i.e., the diameter of the formed tubular structure, in this apparatus can be changed by varying the relative relationship between the slit opening at each lateral edge of the gap between the guide plate 4 and the base plate 3 and the corresponding row of rollers 7. Examples of variable-curvature tube-forming apparatuses based on this principle are illustrated in FIGS. 4 and 5.

In the example shown in FIG. 4, the base plate 3 is yieldably supported by an air cylinder 8 fixed at its lower end to the upper surface of the foundation structure 1. The guide plate 4 is supported in a vertically movable manner by a vertical adjusting screw 11 coupled directly to and rotated by a worm sheel 10 meshed with a worm 9 rotatable by a handle (not shown). By this organization, the guide plate 4 and base plate 3 are moved integrally in the vertical direction, whereby the distance between the open slits at the lateral edges of the gap therebetween and the rollers 7, 7 can be adjustably varied. By appropriately selecting this distance, the curvature of the tube forming can be set at will.

It will be apparent that, since the base plate 3 and guide plate 4 in FIG. 4 have the shape of isosceles triangles, moving these plates in their axial direction instead of in the vertical direction as described above will produce the same effect in controlling the curvature of the tube forming.

In the example illustrated in FIG. 5, rollers 7, 7 are rotatably mounted on respective slidable blocks 7a, 7a which are adjustably movable in the transverse direction and thus supported on the foundation structure 1. In this example, it is possible to select appropriately the distances between the rollers 7, 7 and the lateral edge openings of the gap between the guide plate 4 and base plate 3 and thereby to set as desired the tube-forming curvature by adjustably moving the blocks 7a, 7a in the transverse direction.

It is possible, furthermore, to fabricate tapered tubular structures such as tapered poles continuously through the use of either of the apparatuses illustrated in FIGS. 4 and 5 in the following manner. As shown in FIG. 6, the strip is prepared with alternately-disposed contiguous sections $S_1$ and $S_2$, sections $S_1$ divergently expanding and sections $S_2$ convergently contracting in width in the strip upstream direction.

A device for detecting the width of the strip is mounted at the strip entrance end of the apparatus illustrated in FIG. 4 or 5 and so coupled to the driving mechanism of the adjusting screw 11 or blocks 7a, 7a constituting curvature varying mechanisms as to control either of these mechanisms thereby to controllably vary the curvature of bend. In this manner thin parts of adjacent sections are contiguously disposed and thick parts of adjacent sections are contiguously disposed in alternate sequence. Therefore, by cutting the formed tubular structure at the section junctures between thin parts and between thick parts, tapered poles or the like can be produced.

In still another embodiment of the invention as illustrated in FIG. 7, there is provided a base plate 31 which is of thicker construction than base plate 3 in the preceding examples and rotatably supports eccentric rollers 71, 71 corresponding to rollers 7, 7 previously described. These rollers 71, 71 have projecting outer shaft ends to which are fixed respective pinions P, P. The pinions P, P in the row on each lateral side are coupled by idler gears I interposed between adjacent pinions P, P.

Each of the two rows of pinions P, P is provided with a device (not shown) for applying motive power to one of the pinions in that row, whereby all rollers 71, 71 are rotated. When the rollers 71, 71 are thus driven simultaneously with the application of drawing force on the strip, the parts of the strip contacting the rollers 71, 71 and thereby receiving bending force additionally receive percussive force due to the rotation of the eccentric rollers. Accordingly, a strip of substantially large thickness can be readily bent and curled.

While it is not indicated in FIG. 7, a device can be provided to cause guide plate 4 to vibrate in the strip longitudinal direction, whereby a thick strip can also be readily bent and curled.

In a further embodiment of the invention as illustrated in FIGS. 8 and 9, the rows of rollers 17, 17 and base plate 3 of the preceding example are replaced by an elastic belt 12 mounted movably on a base platform 11 and having an upper run 12a which can travel along the upper surface of the base platform 11 in synchronism with the strip S and under the guidance of a guide roller R.

In the operation of this device, the strip S is subjected to bending forces due to the pressing force of a guide plate 4 and to the resulting deformation of the belt upper run 12a. Consequently, when the strip S is drawn out of the downstream end where the guide plate 4 is narrow, it is curled into cylindrical form similarly as in the aforedescribed examples of the invention.

In this example apparatus, it is possible to vary the tube-forming curvature by adjustably varying the pressing force of the guide plate 4. Furthermore, since there is no relative movement between the strip S and the surface of the belt, the occurrence of scoring and galling of the strip surface is minimized.

In order to facilitate the formation of a concavity in the belt by the pressing force of guide plate 4, this guide plate may be made, not in the form of a single plate, but in the form of two rods in a V-shaped arrangement, or the belt may be made to have a V-shaped cross section or may be divided into two laterally left and right halves.

Figure 12:
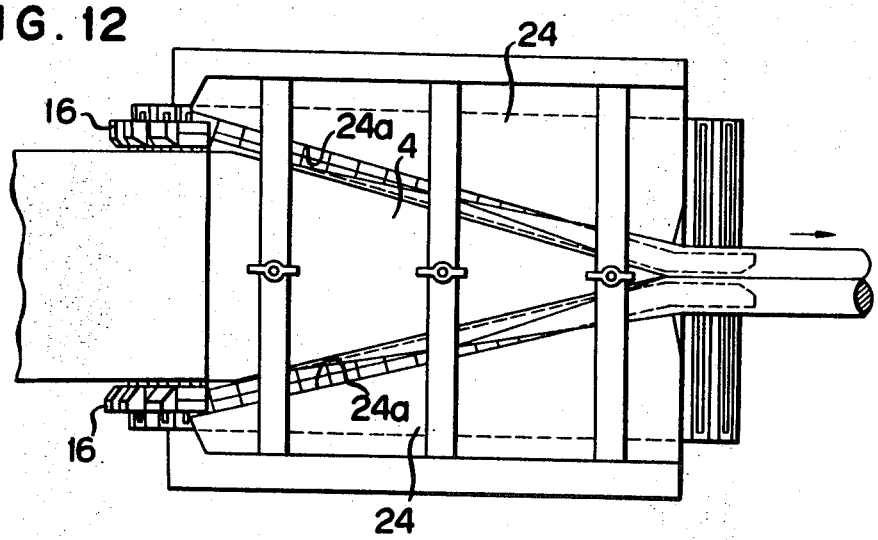
FIG. 12 is a top plan view of the apparatus illustrated in FIGS. 10 and 11.
Figure 13:
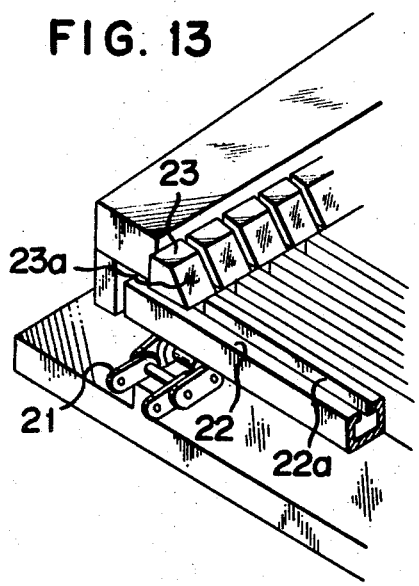
FIG. 13 is a fragmentary perspective view showing an essential part of the apparatus illustrated in FIGS. 10, 11 and 12.
Figure 14:
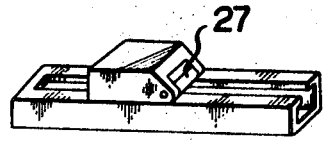
FIG. 14 is an enlarged, fragmentary perspective view showing members of a part shown in FIG. 13.

In a still further embodiment of the invention as illustrated in FIGS. 10 through 14, inclusive, the base plate 3 of preceding examples is replaced by a conveyer 20 of special organization having an upper run 20a moving in the direction of and in synchronism with the advance of a strip S and described in detail hereinafter. The conveyer 20 is supported on the two lateral sides by two parallel endless chains 21 (only one shown in the drawing) driven by sprockets and has a plurality of slide guides 22 arranged perpendicularly to the direction of travel of the chains.

Each slide guide 22 has a channel-shaped cross section with an upwardly facing slot opening 22a in the plane of travel of the conveyer. The slot openings 22a guide slides 23, 23 slidably engaged therewith. Each slide 23 has a buffer surface 23 forming an obtuse angle with the horizontal conveying plane of the conveyer.

This apparatus has a base platform 11 on which there are provided slide control cams 18, 18 having cam surfaces 23a, 24a equidistant respectively from the two lateral edges of a guide plate 4. The cam surfaces 24a, 24a of these cams operate cooperatively with the back surfaces of the slides 23, 23 to cause the slides 23, 23, during their passage past the guide plate 4, to pass along the edge parts thereof.

At a part of the lower run of the conveyer 20, there is provided a cam 25 which divergently widens in the lower run advance direction and operates so that when each slide 23 passes by this cam 25, it is returned to a position near the corresponding end of the slide guide 22. Furthermore, on the lower side of the guide plate 4 on the two lateral sides thereof, there are provided rollers 26, 26 rotatable about axes perpendicular to the conveyer advance direction. Each slide 23 is provided along the lower edge of its buffer surface 23a with a roller 27 which is rotatable about an exit parallel to the conveyer advance direction.

The apparatus of the above described organization operates in a manner similar to that of the previously described examples to form a tubular structure from a strip. During this operation, there is absolutely no relative movement between the surface (lower) to become the outer surface of the tubular structure and the slide guides 22 forming the conveyer, and, moreover, a roller is provided also at the lower edge of each buffer surface 23a to reduce friction. Accordingly, the occurrence of scoring or galling of the inner and outer surfaces of the tubular structure is held to a minimum.

While the invention has been described with respect to examples in which only the essential parts were described in detail, it will be apparent that the organizations of these parts according to the invention can be advantageously combined with various other parts, mechanisms, and devices for a wide range of applications in addition to that of a mere tube-forming apparatus.

For example, by installing at the upstream inlet end of any of the above described apparatuses a material feeding device for successively feeding sheet-by-sheet a sheet material cut to constant dimensions and installing at the downstream outlet end a shape correction device and a welding device, it is possible to fabricate continuously short tubes to become the cylindrical side walls of empty cans for canning which heretofore could not be continuously produced.

Furthermore, the present invention can be practiced in various other modes and forms such as: providing means to reduce the friction in the base plate and guide plate, the rows of rollers, and (or) conveyer; cutting out parts of the two plates and causing a pair of pinch rolls to contact the strip from above and below thereby to drive the same; eliminating the upstream part of the base plate or the entire base plate; installing a mandrel for shape correction or a back bar for welding at the extreme end of the guide plate; and dividing the guide plate into left and right parts, passing a core through the space therebetween, and enveloping this core with the strip material formed into a tubular sheath.

It should be understood, therefore, that the foregoing disclosure relates to only preferred embodiments of the invention and that it is intended to cover all changes and modifications in the examples of the invention herein chosen for the purposes of the disclosure, which do not constitute departures from the spirit and scope of the invention.

We claim:

1. Apparatus for continuously fabricating a tubular structure from a longitudinally advancing strip material having lateral edges, comprising; constraining means for constraining said strip material over a planar constraint region converging in width in the direction of advance of the strip material and for forming an advance path for the strip material, said path having outlet openings corresponding to said lateral edges of the strip; and members having buffer surfaces disposed to operate in synchronism with the strip material and inclined with an obtuse dihedral angle with respect to the strip material in said constraint region, said constraining means including a guide plate and a base plate both operating cooperatively and having a planar shape substantially of an isosceles triangle, and each of said buffer surfaces being formed by a row of rollers having rotational axes perpendicular to the direction of advance of the strip material.

2. Apparatus as claimed in claim 1 wherein said row of rollers comprises eccentric rollers driven by motive power means.

References Cited

UNITED STATES PATENTS

| | | | |
|---|---|---|---|
| 841,838 | 1/1907 | Williams | 72—176 |
| 1,980,308 | 11/1934 | Adams, Jr. | 72—176 |
| 3,236,083 | 2/1966 | Linderoth, Jr. et al. | 72—176 |
| 3,370,448 | 2/1968 | Ruple | 72—176 |
| 3,387,478 | 6/1968 | Burr | 72—176 |

MILTON S. MEHR, Primary Examiner